(12) United States Patent
Miller et al.

(10) Patent No.: US 8,187,051 B2
(45) Date of Patent: May 29, 2012

(54) DIGITAL ARTS AND CRAFTS COMPUTER PERIPHERAL TOY DEVICE

(75) Inventors: Jeffrey J. Miller, Orchard Park, NY (US); George A. Inashvili, East Aurora, NY (US); John W. Taylor, Cowlesville, NY (US); Bruce R. Cordier, West Seneca, NY (US); Rachel A. Wiatrowski, Cheektowaga, NY (US); Rebecca S. Barclay, West Seneca, NY (US); Diane M. Gambino, Orchard Park, NY (US)

(73) Assignee: Mattel, Inc., El Segundo, CA (US)

( * ) Notice: Subject to any disclaimer, the term of this patent is extended or adjusted under 35 U.S.C. 154(b) by 1171 days.

(21) Appl. No.: 11/924,724

(22) Filed: Oct. 26, 2007

(65) Prior Publication Data

US 2009/0113091 A1    Apr. 30, 2009

(51) Int. Cl.
*A63H 30/00* (2006.01)
*G06F 3/041* (2006.01)
*G09B 11/00* (2006.01)

(52) U.S. Cl. .......... 446/175; 345/173; 345/156; 434/85; 434/365

(58) Field of Classification Search .................. 345/173, 345/156–157, 179, 184; 446/175; 434/81, 434/84–85, 365, 428
See application file for complete search history.

(56) References Cited

U.S. PATENT DOCUMENTS

| | | |
|---|---|---|
| 3,767,858 A | 10/1973 | Rodgers |
| 4,200,867 A | 4/1980 | Hill |
| 4,782,335 A | 11/1988 | Gussin |
| 4,793,810 A | 12/1988 | Beasley, Jr. |
| 4,887,968 A | 12/1989 | Wickstead et al. |
| 5,100,329 A | 3/1992 | Deesen et al. |
| RE34,187 E | 3/1993 | Yamanami et al. |
| 5,250,930 A | 10/1993 | Yoshida et al. |

(Continued)

FOREIGN PATENT DOCUMENTS

JP    57-169841    10/1982

(Continued)

OTHER PUBLICATIONS

International Search Report for PCT/US08/79911, dated Dec. 19, 2008.

*Primary Examiner* — Dmitry Suhol
*Assistant Examiner* — Alex F. R. P. Rada, II
(74) *Attorney, Agent, or Firm* — Edell, Shapiro & Finnan, LLC

(57) ABSTRACT

A computer peripheral toy device is provided that connects to a personal computer and enables a child user to create drawings, animated figures, cards, posters, and other projects and items. The device includes a housing having a drawing tablet and a stylus that connects to the housing for use on the drawing tablet. There a plurality of buttons on the top surface of the housing that a user depresses when engaging in a drawing activity. Computer software is provided for installation on the personal computer in order to display data associated with a drawing activity. When executed by the computer, the computer software causes the computer to respond to the messages received from the controller to engage in a drawing activity using drawing style parameters based on which of the drawing style buttons, color palette buttons and design tool buttons are selected by a user.

21 Claims, 12 Drawing Sheets

U.S. PATENT DOCUMENTS

| | | | |
|---|---|---|---|
| 5,311,207 A * | 5/1994 | Kusumoto et al. | 345/601 |
| 5,382,233 A | 1/1995 | Brotz | |
| 5,410,334 A | 4/1995 | Comerford | |
| 5,485,176 A | 1/1996 | Ohara et al. | |
| 5,511,983 A | 4/1996 | Kashii et al. | |
| 5,513,991 A | 5/1996 | Reynolds et al. | |
| 5,604,517 A | 2/1997 | Filo | |
| 5,612,720 A | 3/1997 | Ito et al. | |
| 5,670,992 A | 9/1997 | Yasuhara et al. | |
| 5,693,914 A | 12/1997 | Ogawa | |
| 5,730,602 A | 3/1998 | Gierhart et al. | |
| 5,739,814 A | 4/1998 | Ohara et al. | |
| 5,792,997 A | 8/1998 | Fukuzaki | |
| 5,796,388 A | 8/1998 | Yasuhara et al. | |
| 5,832,113 A | 11/1998 | Sano | |
| 5,963,199 A * | 10/1999 | Kato et al. | 345/179 |
| 6,005,545 A | 12/1999 | Nishida et al. | |
| 6,067,073 A | 5/2000 | Rae-Smith | |
| 6,191,777 B1 * | 2/2001 | Yasuhara et al. | 345/173 |
| 6,462,733 B1 * | 10/2002 | Murakami | 345/173 |
| 6,469,696 B1 | 10/2002 | Ishimura et al. | |
| 6,608,618 B2 * | 8/2003 | Wood et al. | 345/173 |
| RE38,286 E | 10/2003 | Flowers | |
| 6,639,577 B2 | 10/2003 | Eberhard | |
| 6,641,401 B2 | 11/2003 | Wood et al. | |
| 6,661,405 B1 | 12/2003 | Flowers | |
| 6,676,411 B2 | 1/2004 | Rehkemper et al. | |
| 6,755,656 B2 | 6/2004 | Jelinek et al. | |
| 6,801,211 B2 | 10/2004 | Forsline et al. | |
| 6,882,338 B2 | 4/2005 | Flowers | |
| 6,947,033 B2 * | 9/2005 | Fåhraeus et al. | 345/175 |
| 6,954,199 B2 | 10/2005 | Soto et al. | |
| 6,985,139 B2 | 1/2006 | Marggraff et al. | |
| 7,083,420 B2 | 8/2006 | Wood et al. | |
| 2001/0038999 A1 | 11/2001 | Hainey, II | |
| 2003/0090493 A1 | 5/2003 | Masuda et al. | |
| 2004/0056849 A1 | 3/2004 | Lohbihler et al. | |
| 2004/0179001 A1 | 9/2004 | Morrison et al. | |
| 2005/0237295 A1 | 10/2005 | Anderson | |
| 2006/0050061 A1 | 3/2006 | Aiken et al. | |
| 2006/0166592 A1 | 7/2006 | Nielsen et al. | |
| 2006/0250381 A1 * | 11/2006 | Geaghan | 345/179 |
| 2006/0252541 A1 | 11/2006 | Zalewski | |
| 2007/0242824 A1 | 10/2007 | Vishik | |

FOREIGN PATENT DOCUMENTS

JP  2004-030329  1/2004

* cited by examiner

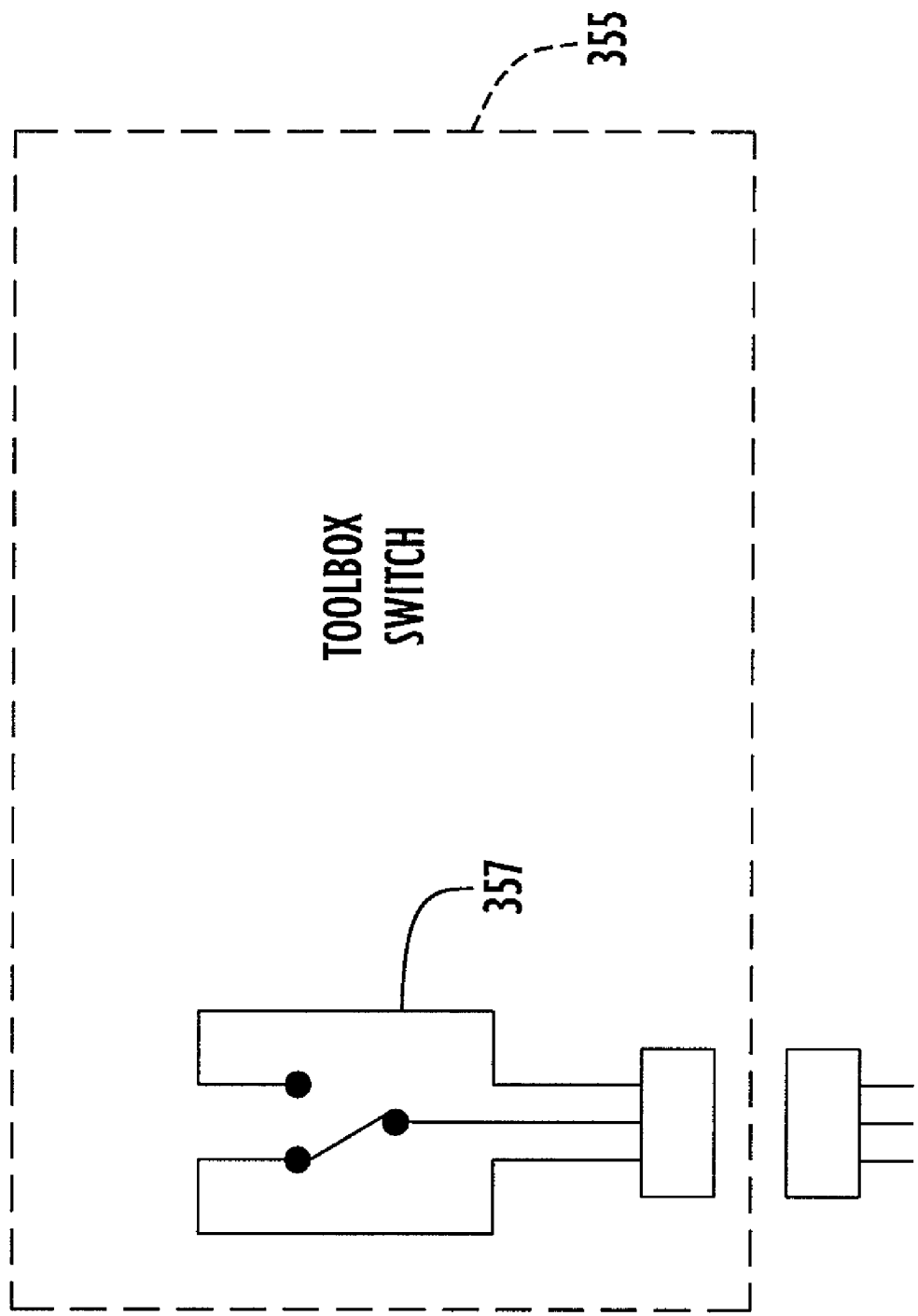

DIGITAL ARTS AND CRAFTS COMPUTER PERIPHERAL TOY DEVICE

BACKGROUND OF THE INVENTION

The present invention relates to a computer peripheral device that allows a child user to engage in various drawing activities with a personal computer.

There are numerous computer software programs that are designed for use by small children to permit a child to engage in drawing and coloring projects. However, these software programs require the use of a computer mouse, and in some cases, a computer keyboard as well. Consequently, many child users, depending on their age and dexterity with a computer mouse and keyboard, cannot operate these drawing software programs and/or in many instances require the assistance of a parent or older child. This is a major drawback of these software programs.

At the other end of the spectrum there are drawing toys that do not connect to a computer but nevertheless allow a child to make drawings. These toys may have limited data storage capability to allow a user to make a drawing, save the drawing and subsequently retrieve a drawing for viewing or editing. However, these devices do not provide a user with the ability to transfer data for the drawing to a printer in order to print a hard-copy of the drawing. In addition, in many cases these devices do not allow for transferring the data for a drawing to an external device, such as a personal computer. Moreover, many of these toys require the use of a physical template that fits over a drawing surface to assist a user in making a drawing and/or engaging in an activity.

It is desirable to provide a drawing toy device that connects to a standard personal computer, but that is nevertheless easy to use for a small child so that the child can operate the device without assistance from a parent or older child.

SUMMARY OF THE INVENTION

Briefly, a computer peripheral toy device is provided that connects to a personal computer and enables a child user to create drawings, animated figures, cards, posters, and other printable paper projects and items. The device comprises a housing having a drawing tablet and a stylus that connects to the housing for use on the drawing tablet. A connection cable, such as a Universal Serial Bus (USB) cable connects the housing to a personal computer. The housing includes a plurality of buttons on its top surface that a user can depress when engaging in a drawing activity. Specifically, there is a plurality of drawing style buttons, each of which is shaped to simulate an appearance of an inkwell and is configured to be depressed by a tip of the stylus. There are a plurality of design tool buttons disposed on the housing adjacent to the drawing tablet, and a plurality of color palette buttons positioned on the housing adjacent to the drawing tablet and arranged to simulate an appearance of a painter's palette.

Electronics for the computer peripheral device are mounted on one or more printed circuit boards positioned inside in the housing. The controller is electrically connected to switches associated with each of the drawing style buttons, design tool buttons, and color palette buttons, and to the stylus. The controller determines a position of the stylus on the drawing tablet and detects when a switch is actuated by detecting, e.g., when a user depresses one of the design tool buttons, the drawing style buttons and/or the color palette button and supplies messages to the computer comprising information representing the same.

Computer software is provided for installation on the personal computer to communicate with the computer peripheral device in order to display data associated with a drawing activity. When executed by the computer, the computer software causes the computer to respond to the messages received from the controller in the computer peripheral device to engage a user in a drawing activity using drawing style parameters based on which of the drawing style buttons, color palette buttons and design tool buttons are selected by a user.

BRIEF DESCRIPTION OF THE DRAWINGS

FIGS. 8-10 are schematic diagrams of the switches used in connection with buttons on the computer peripheral toy device of the present invention.

DETAILED DESCRIPTION

Figure 1:
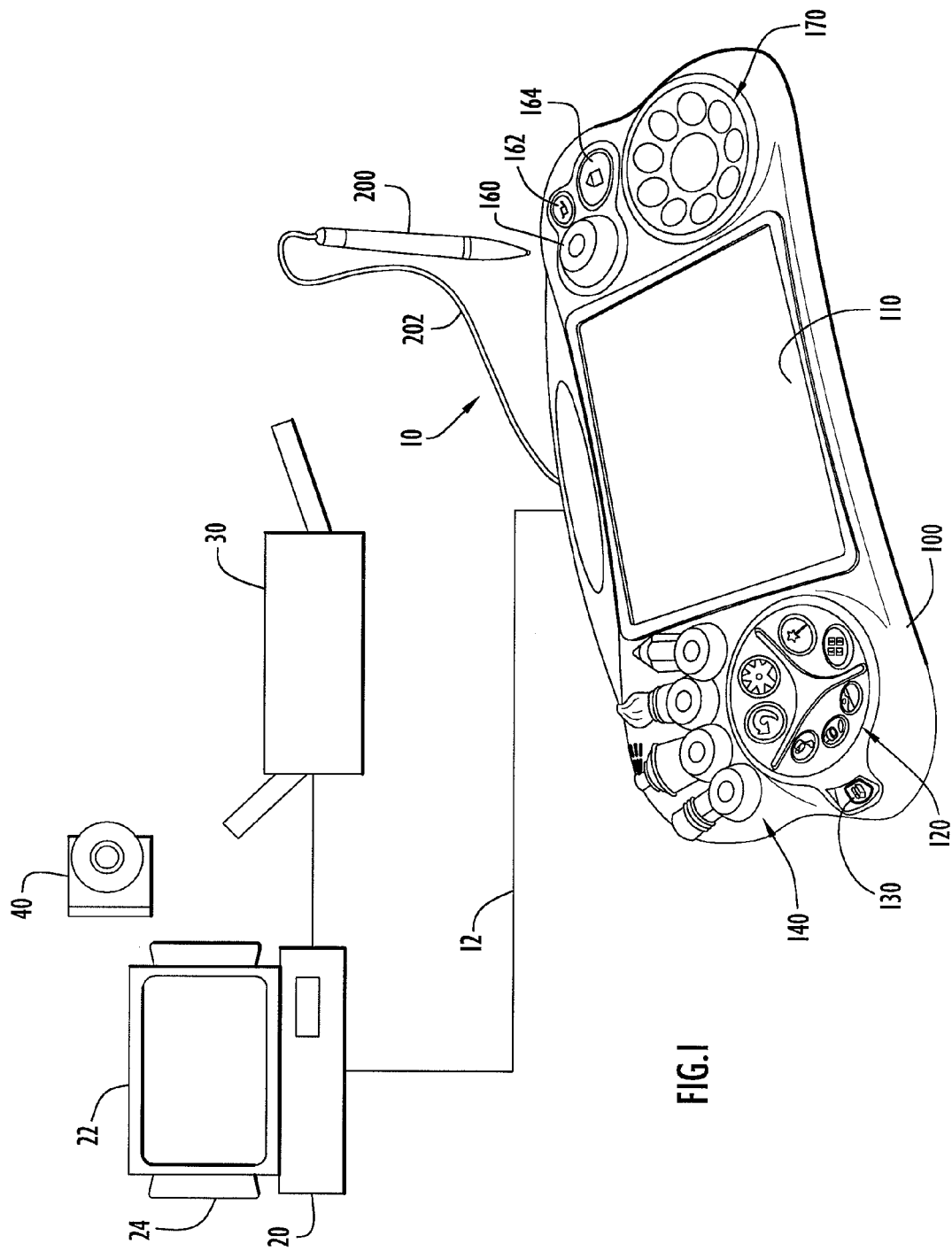
FIG. 1 is a perspective view of a computer peripheral toy device connected to a computer according to an embodiment of the present invention.

Referring first to FIG. 1, the computer peripheral toy device is shown generally at reference numeral 10. The device 10 connects to a personal computer (PC) 20 via a standard connection cable 12. For example, the cable 12 is a Universal Serial Bus (USB) cable in which case the device 10 implements the USB standard to interface with the PC 20 and be powered by the PC 20. Driver software in the form of one or more computer programs are installed on the PC 20 to perform various functions in conjunction with the device 10. For example, the driver software is stored on a compact disk (CD) 40 from which it is installed on the PC 20. In addition, a display monitor 22, loudspeakers 24 and a printer 30 are connected to the PC 20. The functions of the display monitor 22, loudspeakers 24 and printer 30 in conjunction with the operation of the device 10 are described further hereinafter. The device 10 enables a user to use the PC to create drawings, animated figures, cards, posters, and various other items described in more detail hereinafter.

The device 10 comprises a housing 100 and stylus 200 that connects via a cable 202 to electronic components contained within the housing 200. The housing 100 may be sized and shaped to fit in front of a display monitor 22 in operation, in much the same way that a keyboard is positioned and used with a PC. The device 10 comprises a drawing tablet 110 having a drawing surface that cooperates with the stylus 200 to perform user input and other functions described in more detail hereinafter. On one side of the tablet 110 on the housing 100, there are plurality of design tool buttons 120 in a dedicated circular area and a plurality of "inkwell" drawing style buttons 140 above the design tool buttons 120. There is also a toolbox switch 130 positioned proximate the design tool buttons 120. On the other side of the tablet 110 on the housing 100, there is a shallow cylindrical receptacle 160 that can receive and temporarily store the stylus 200, a utilities button 162, a project studio button 164 and a plurality of color palette buttons 170.

Basically, with more detail provided hereinafter, the device 10 connects to the PC 20, allowing a user to make drawings on the tablet 110 while the drawings are simultaneously displayed on the display monitor 22.

Figure 2:
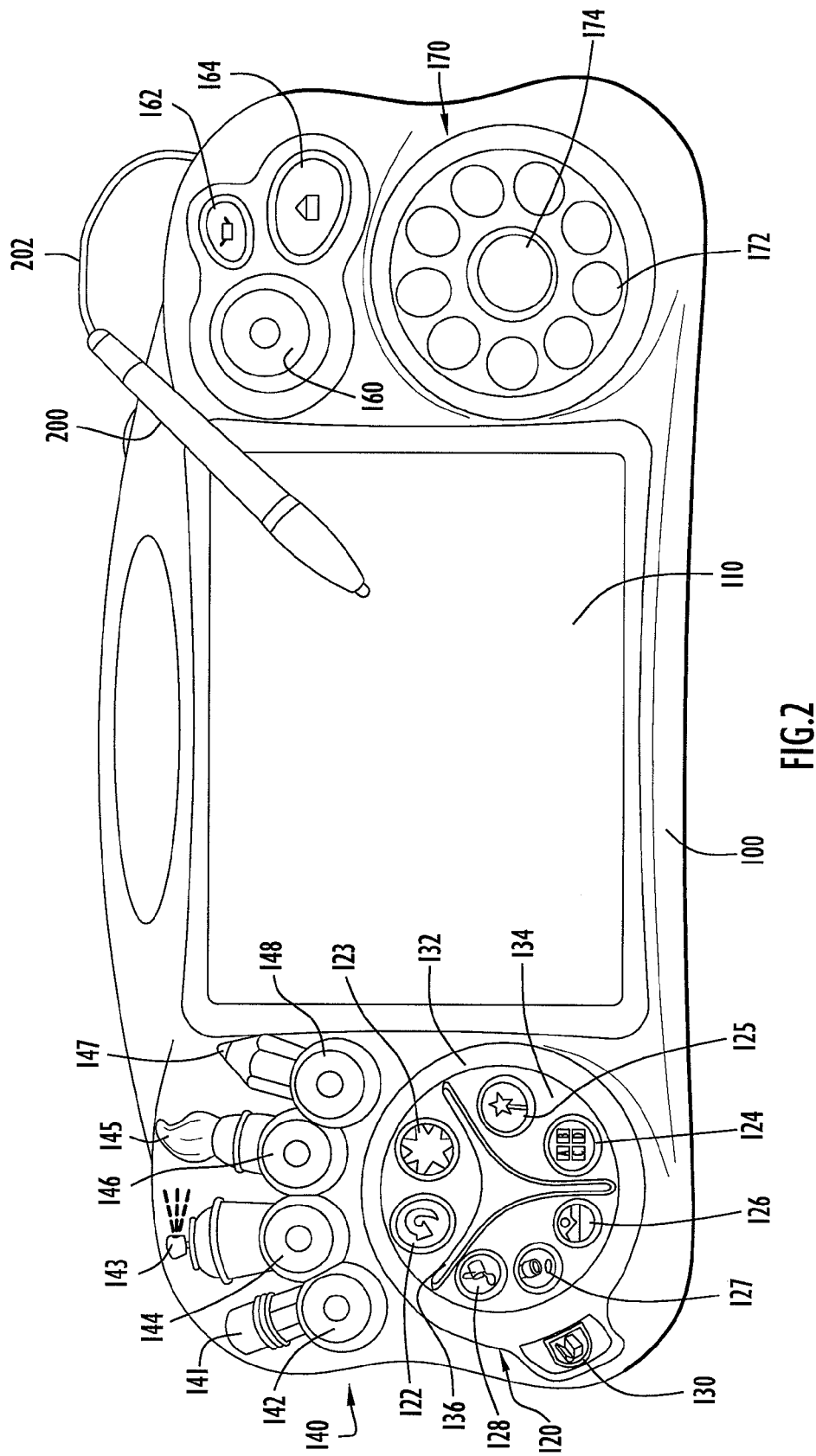
FIG. 2 is a top view of the computer peripheral toy device according to an embodiment of the present invention.

With reference to FIG. 2, the design tool buttons 120 comprise an undo button 122, an erase screen button 123, a type/keyboard button 124, a special effects button 125, a background button 126, a stamper button 127 and a paint bucket button 128. The undo button 122, when pressed, causes the software on the PC 20 to undo the user's last action, and when pressed again causes the software to redo that last action. The screen erase button 123 causes the software to clear the screen to allow the user to start over whatever activity he/she was performing. In one embodiment, the screen erase button 123 causes a simulated explosion graphic video effect with accompanied audio, for example a starburst explosion that gradually clears away the entire screen on the display monitor 22. The type/keyboard button 124 causes display of a virtual keyboard to allow a user to type or otherwise enter text for titles, captions, etc., to be added to a work project. The special effects button 125 applies one or more special visual effects to a picture, such as a swirl, squeeze or reverse effect, described further hereinafter. The backgrounds button 126 allows the user to select a background image to start a picture or project. Users can upload/add photos or other images to the PC 20 for use with the backgrounds function, described in more detail hereinafter. The stamper button 127 allows the user to choose a "stamp" to decorate pictures and other projects. Like the backgrounds function, users can upload and add photos or other images to the PC for use with the stamper functions. The paint bucket button 128 causes a particular user-selected color to be filled into an enclosed area of an image of a picture or project on which the user is working. Each of the design tool buttons 120 has a graphic image visible on its top surface, where the graphic image corresponds to the function of the corresponding button. For example, the undo button 122 has a rounded arrow image, the erase screen button 123 has a explosion image, the keyboard button 124 has an image of multiple letters, the special effects button has a magic wand image, the background button 126 has a landscape scene image, the stamper button 127 has image of stamp device and stamp graphic, the paint bucket button 128 has an image of a bucket spilling paint.

In one embodiment, the design tool buttons 120 are arranged in a circular arrangement on a surface 132, and are partitioned on the face in sectors 134 that are separated by raised divider members 136 to simulate an appearance of a dial mechanism. Moreover, the surface 132 may be concave downward into a cavity of the housing 100.

The toolbox switch 130 is a slider switch that can be moved between first and second positions. The first position is, for example, a down position, in which the toolbox functions are disabled and the second position is an upward position which activates the toolbox functions. A controller in the device 10, which is described in further detail hereinafter, detects the position of the toolbox switch 130 and sends an control signal (status message) to the software on the PC 20 indicating the position of the toolbox switch 130. On the face of the toolbox button 130 is an image of a toolbox. When the toolbox functions are activated, the software on the PC 20 generates and presents a display screen or window on the display monitor 22 that allows the user to select a style and size for lines made by the stylus 200 for certain activities, and also to choose from among a plurality of categories for images used by the stamper function and the background function. The toolbox function is described in more detail hereinafter.

The inkwell buttons 140 comprise an eraser button 142, a spray paint button 144, a paint brush button 146 and a pencil button 148. These buttons are used to change the drawing effect of the stylus 200. The eraser button 142 invokes a pencil eraser function, the spray paint button 144 invokes a spray paint tip for creating a sprayed appearance, the paint brush button 146 invokes a paint brush stroke appearance and the pencil button 147 invokes a drawing line appearance.

Figure 3:
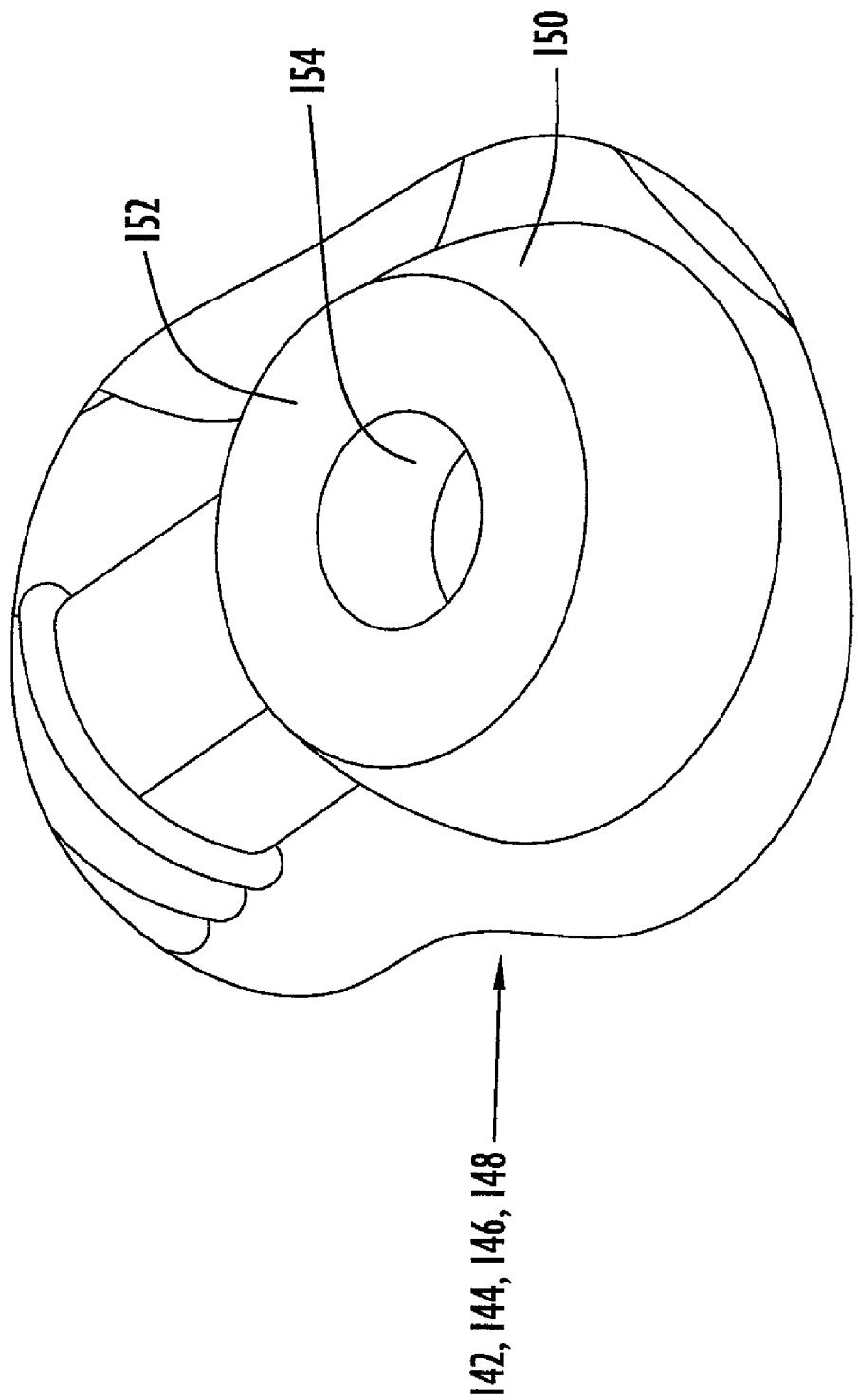
FIG. 3 is an enlarged perspective view of an inkwell drawing style button that is disposed on the housing of the computer peripheral toy device.

Turning to FIG. 3, the inkwell buttons are described in more detail. Each of the buttons 142, 144, 146, and 148 reside in a raised base 150 and comprise a circular donut-shaped member 152 having a center concave portion 154 that is sized to receive a sufficient length portion of the distal end of the stylus 200. This configuration simulates the function and appearance of an inkwell whereby a user can insert the tip of the stylus 200 into the center concave portion 154 and depress the member 152 downward to invoke the corresponding stylus feature. According to one embodiment of the invention, the donut-shaped member 152 is made of a material that transmits light and beneath the member 152 is an LED (not shown) that can be illuminated when the button is depressed or for other purposes. Moreover, the LED beneath the member 152 may be a different color for each of the buttons 142, 144, 146 and 148, or the plastic over the LED may be made of different colors.

Referring back to FIG. 2, associated with each of the buttons is a raised graphic member whose appearance corresponds to the function of the inkwell button below it. For example, there is an eraser graphic member 141 formed on the housing 100 and above the base of the eraser button 142. There is a spray paint graphic member 143 on the housing above the base of the spray paint button 144. A paint brush graphic member 145 is on the housing above the spray paint button 146 and there is a pencil graphic member 147 above the pencil button 148. Thus, each graphic member 141, 143, 145 and 147 has an ornamental appearance or likeness that represents the function of its corresponding inkwell button.

The stylus storage receptacle 160 to the right of the tablet 110 may be circular in shape and have a center hole 161 that is sized to receive a distal length portion of the stylus 200. The receptacle 160 may be disposed within a raised base member to simulate an inkwell similar to that for the inkwell buttons 140.

The utilities button 162 invokes a utilities function of the driver software on the PC 20. In one embodiment, the utilities button has a graphic image of a printer and a plus symbol ("+") on its top surface. The utilities functions include printing a project, saving a project, accessing an image or picture gallery and sharing a project. These functions are described in further detail hereinafter.

The project studio button 164 invokes display on the display monitor of a menu of activities from which a user may select. There is a graphic image on the button 164 that is intended to correspond with a "home" or menu function, such as a paintbrush, house and scissors. The activities menu is described in further detail hereinafter.

The color palette 170 is located in a dedicated circular area to the right of the drawing tablet 110. The color palette 170 comprises a plurality of individual color buttons 172 and a color spectrum button 174. The color buttons 172 are in a circular arrangement on a surface 176 that may be concave downward into a cavity of the housing 100 to simulate the appearance of a painter's palette. Each of the color buttons 172 has a top surface having a color such that when pressed causes display of the corresponding color. The color spectrum button 174 is used to invoke a color spectrum from which a user can more precisely select a particular color for an activity.

The device 10 may support the use of accessory functions that are installed on the PC 20 after initial installation of the driver software. In this case, one or more of the buttons on the front of the device 10 may be used in connection with one of these accessory functions as well as with the basic set of functions that are part of the driver software initially installed on the PC 20.

Figure 4:
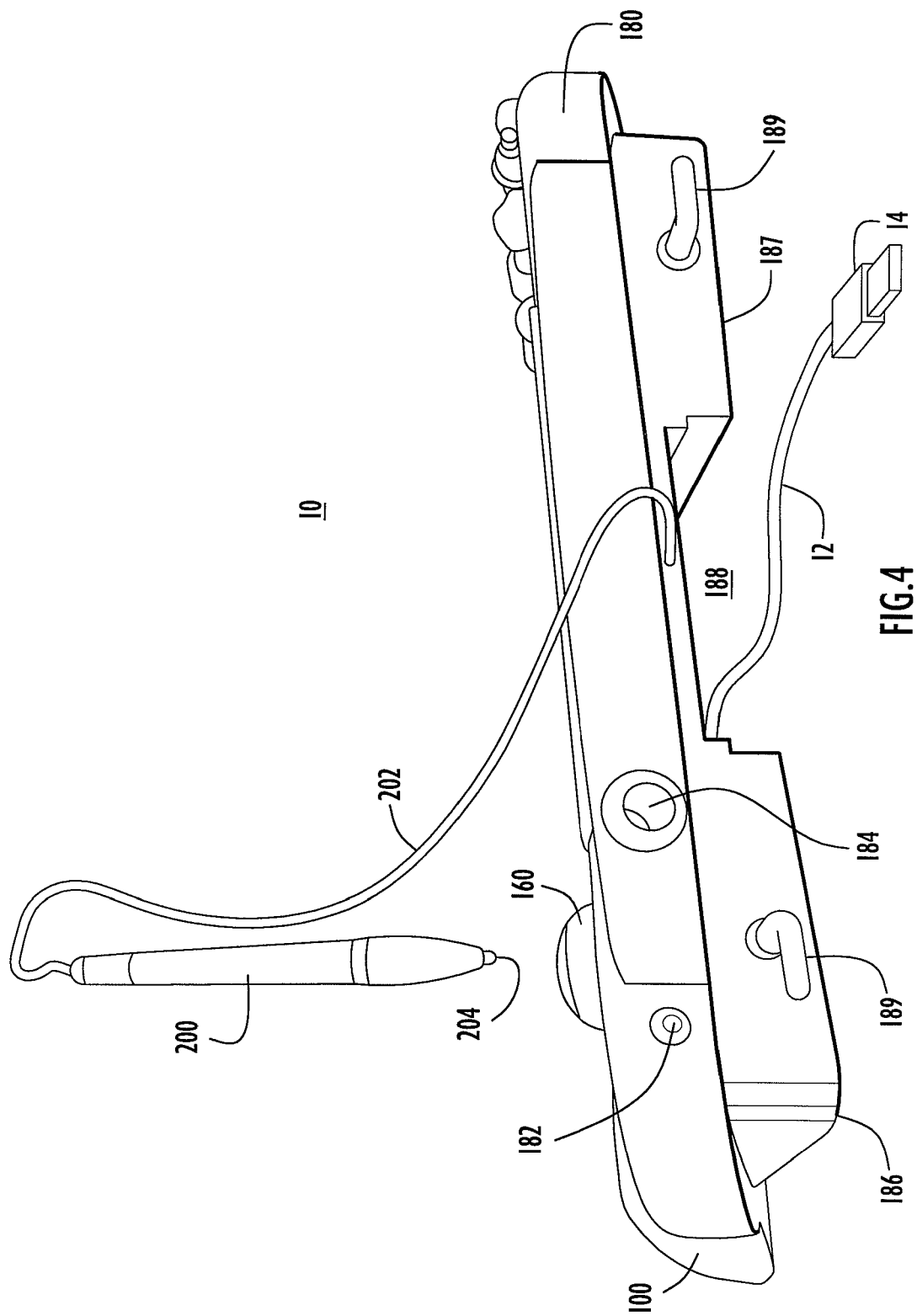
FIG. 4 is a view of the back of the housing of the computer peripheral toy device according to an embodiment of the present invention.

Referring to FIG. 4, the back of the housing 100 of the device 10 is shown. The housing 100 has a back surface 180 that is substantially vertical. An on/off button 182 is provided on the back surface 180. The on/off button 182 is used to activate the device 10 and the computer programs on the host PC that operate with the device 10 after it has been plugged into a host PC. Similarly, a user may deactivate the computer programs for the device 10 on the host PC 20 by depressing the on/off button while the device 10 is connected to the PC and the computer programs are active. Thus, the on/off switch 182 does not control the power to the device. Once device 10 is plugged into the USB port of the PC 20, the device 10 is essentially always powered. The on/off switch 182 is a button that calls to the driver software to start or end the application.

There is a storage receptacle 184 that extends into the back surface 180 of the housing 100 that allows for more permanent storage of the stylus 200 when the device 10 is not in use. The receptacle 184 is an elongated hole that is sized to receive substantially an entire length portion of the stylus when not in use. The connection cable 12 also connects at the back of the housing 100 and includes a plug member 14, such as a standard USB plug connector.

As shown in FIG. 4, the tip of the stylus 200 comprises a push button 204. The pushbutton 204 activates a push switch inside the stylus 200. The operation of the push button 204 and associated switch are described hereinafter in connection with FIG. 7.

Still referring to FIG. 4, there are two support surfaces formed along the bottom horizontal surface of the housing 100, with a gap 188 there between. The gap 188 provides access to a slot (not shown) that can be used to contain the CD 40 in which the computer software for the device 10 is stored. There are also two L-shape hook members 189 on lower vertical surfaces of the housing 100. The hook members 189 are positioned at a distance from each other to allow the connection cable 14 to be wrapped around them for storage purposes when the device 10 is not in use.

Figure 5:
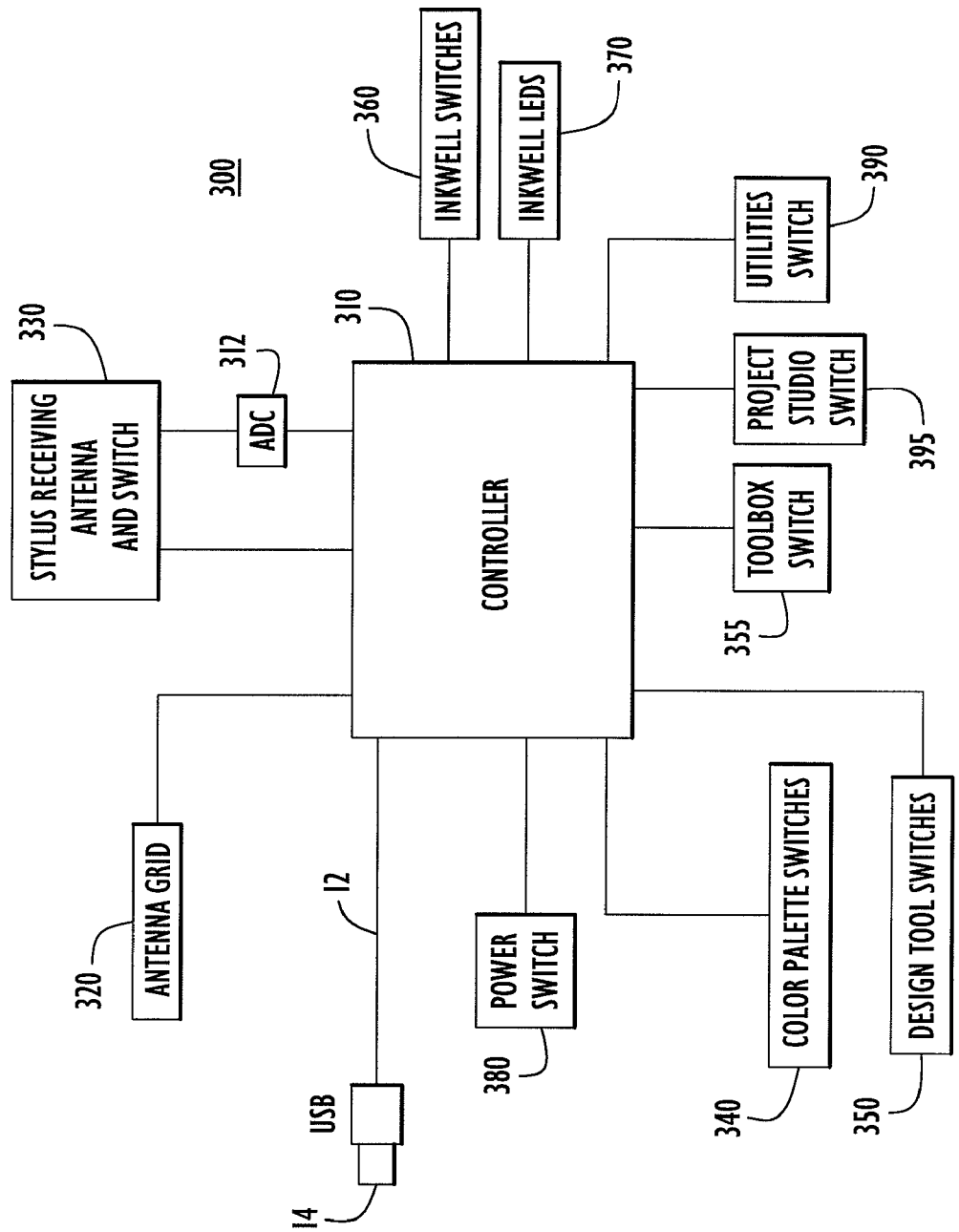
FIG. 5 is a block diagram of the control system of the computer peripheral toy device according to an embodiment of the present invention.

Turning to FIG. 5, a block diagram of the control system of the device 10 is now described. The control system is generally shown at reference numeral 300 and comprises a controller 310 that connects to supporting electronic components. The controller 310 may be a programmable microcontroller having integrated USB interface capability. For example, the controller 310 is an 8-bit flash-programmable microcontroller, such as is available from Cypress Semiconductor. However, other microcontrollers having similar functionality may also be used, and they need not incorporate on-board USB interface capability. The USB interface capability may be provided in a separate integrated circuit if so desired. An antenna grid 320 is mounted beneath the drawing surface of the drawing tablet 110 that operates in conjunction with a stylus receiving antenna and switch shown collectively at 330 that are mounted within the stylus 200. There are a block of color palette switches 340 that are associated with the color palette 170, design tool switches 350 associated with the design tool buttons 120, inkwell switches 360 and inkwell LEDs 370 associated with the inkwell buttons 140, a power switch 380, a utilities switch 390 associated with the utilities button 162, and a project studio switch 395 associated with the project studio button 164. In addition, there is an analog-to-digital converter (ADC) 312 that is connected to the receiving antenna output of the stylus receiving antenna in block 330 in order to convert the analog received signal to a digital signal for processing by the controller 310. Alternatively, the ADC 312 may be integrated into the controller 310.

Figure 7:
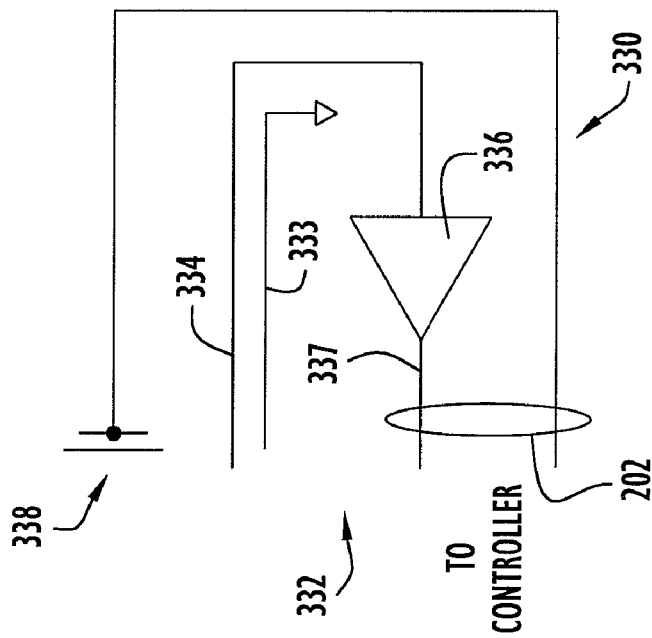
FIG. 7 is schematic diagram of the circuit components inside a stylus device that is used with the drawing tablet of the computer peripheral toy device of the present invention.
Figure 6:
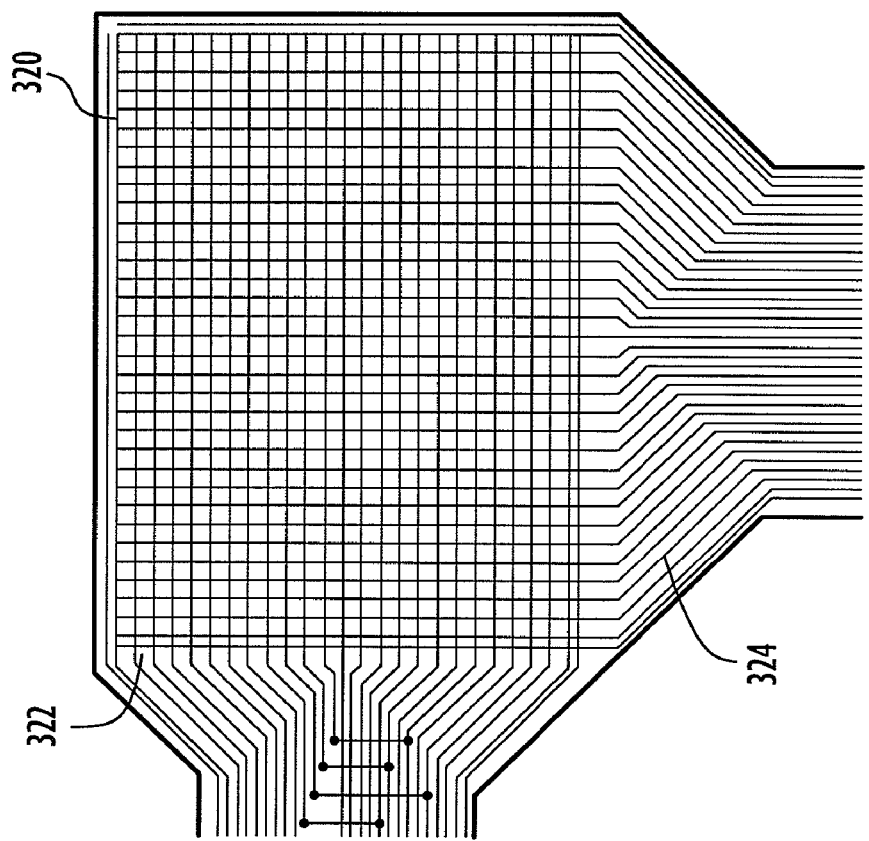
FIG. 6 is a schematic diagram of an antenna grid that is used in connection with a drawing tablet of the computer peripheral toy device according to an embodiment of the present invention.

Turning to FIGS. 6 and 7, the antenna grid 320 and stylus receiving antenna and switch 330 are described in more detail. As shown in FIG. 6, the antenna grid 320 comprises a conductor trace grid array that is positioned under the surface of the tablet 110 and is used to locate the tip of the stylus 200. The antenna grid 320 comprises a plurality of antenna traces 322 along the x-axis and a plurality of antenna traces 324 along the y-axis.

As shown in FIG. 7, the receiving antenna and switch 330 comprises a coaxial antenna 332 having an outside shell 333 connected to ground and a center conductor 334 that serves as the receiving antenna conductor. The center conductor is biased to a certain voltage, and supplies a received signal to an amplifier 336. The amplified signal at the output of the amplifier 336 is routed through a conductor 337 that is inside the connection cable 202, and ultimately to the controller 310. For example, in one embodiment of the amplifier is a two-stage JFET-based operational amplifier. The input stage and first stage of the amplifier 336 are surrounded by a ground plane on the backside of printed circuit board, and a formed metal shield (soldered to the ground plane) above it. There is also a push switch 338 inside the tip of the stylus 220 that is actuated (closed) when the push button 204 at the tip of the stylus 200 is depressed.

The antenna grid 320 and associated receiving antenna structure and function are well known in the art, and are described, for example, in U.S. Pat. No. 6,244,960. Nevertheless, their operation is described briefly as follows.

Each of the antennas in the antenna grid 320 transmits a repeating pulse train that is picked up by the receiving antenna 332 in the stylus 200. For example, in one embodiment, the tablet 110 has an area of 1024×768 pixels over a physical area of 216 mm (8.5 inches)×157.5 mm (6.2 inches). With an antenna grid of 32 squares by 24 squares, each square covers 32 pixels in the X direction and 32 pixels in the Y direction, and the antennas would have a center-center spacing of 6.75 mm×6.56 mm. Consequently, the controller 310 interpolates signals strengths to 32 levels (or 6 bits). Using an analog-to-digital (A/D) input of a 1.0V maximum signal strength, the ADC 312 resolves 0.03125V/bit in order to distinguish 32 possible signal levels. The amplified received signal is coupled to the ADC 312 to convert the analog signal to a digital signal for processing by the controller 310 in order to track the location of the stylus 200. Moreover, the controller 310 can detect where the stylus tip is located when the push button 204 is pressed sufficiently to close the push switch 338. The push button switch 204 needs to be pressed when the user draws on the tablet 110 to display a corresponding line, brush stroke, etc., as well as when the user wants to select an icon that is displayed in a menu screen.

The signals to the conductive traces of the antenna grid 320 may be multiplexed to reduce the number of input/outputs needed to the antenna grid 320. For example, 12 output signals from the controller 310 power 33 antenna traces along the x-axis in the antenna grid 320, and 12 output signals from the controller 310 power 25 traces along the y-axis in the grid 320. The antenna grid 320 may be arranged so that no 2 neighbors of multiplexed signals are directly next to each other in any more than one spot. Consequently, the controller 310 can monitor which "neighbor" signal is being received in addition to the main "strong" signal received to determine which multiplexed "strong" signal antenna line is being touched by the stylus 200.

Figure 8:
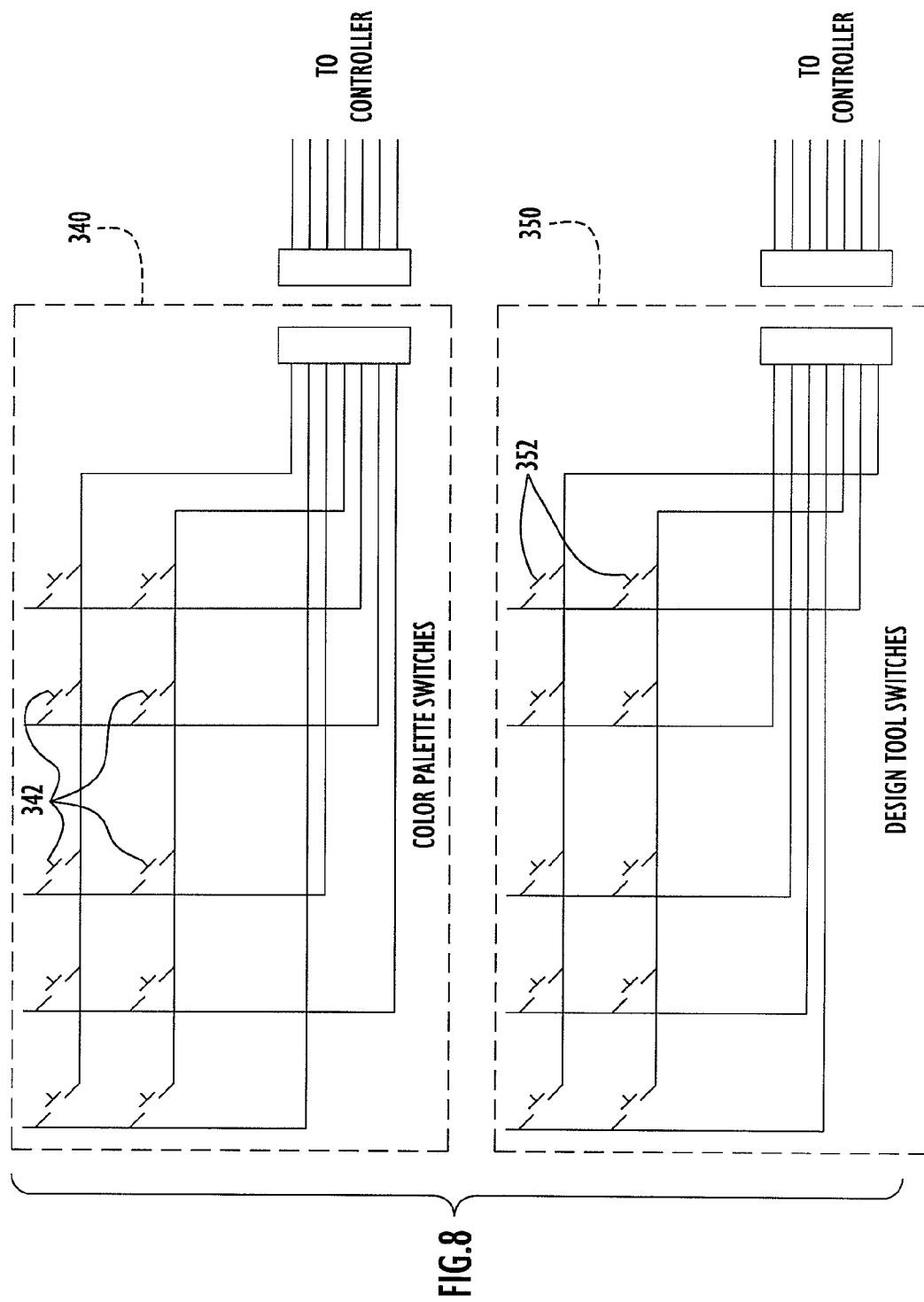

Turning to FIG. 8, the color palette switches 340 and design tool switches 350 are described. The color palette switches 340 comprise a plurality of push switches 342, each for a corresponding one of the color palette buttons 172 and for the color spectrum button 174. All of the push switches 342 may be mounted on a common printed circuit board that is positioned in the housing beneath the color palette 170, and which is electrically connected to the controller 310. Similarly, the design tool switches 350 comprises a plurality of switches 352 each for a corresponding one of the design tool buttons 122-128. The switches 352 also may be mounted on a common printed circuit board that is positioned in the housing beneath the design tool buttons 120, and which is electrically connected to the controller 310.

Figure 9:
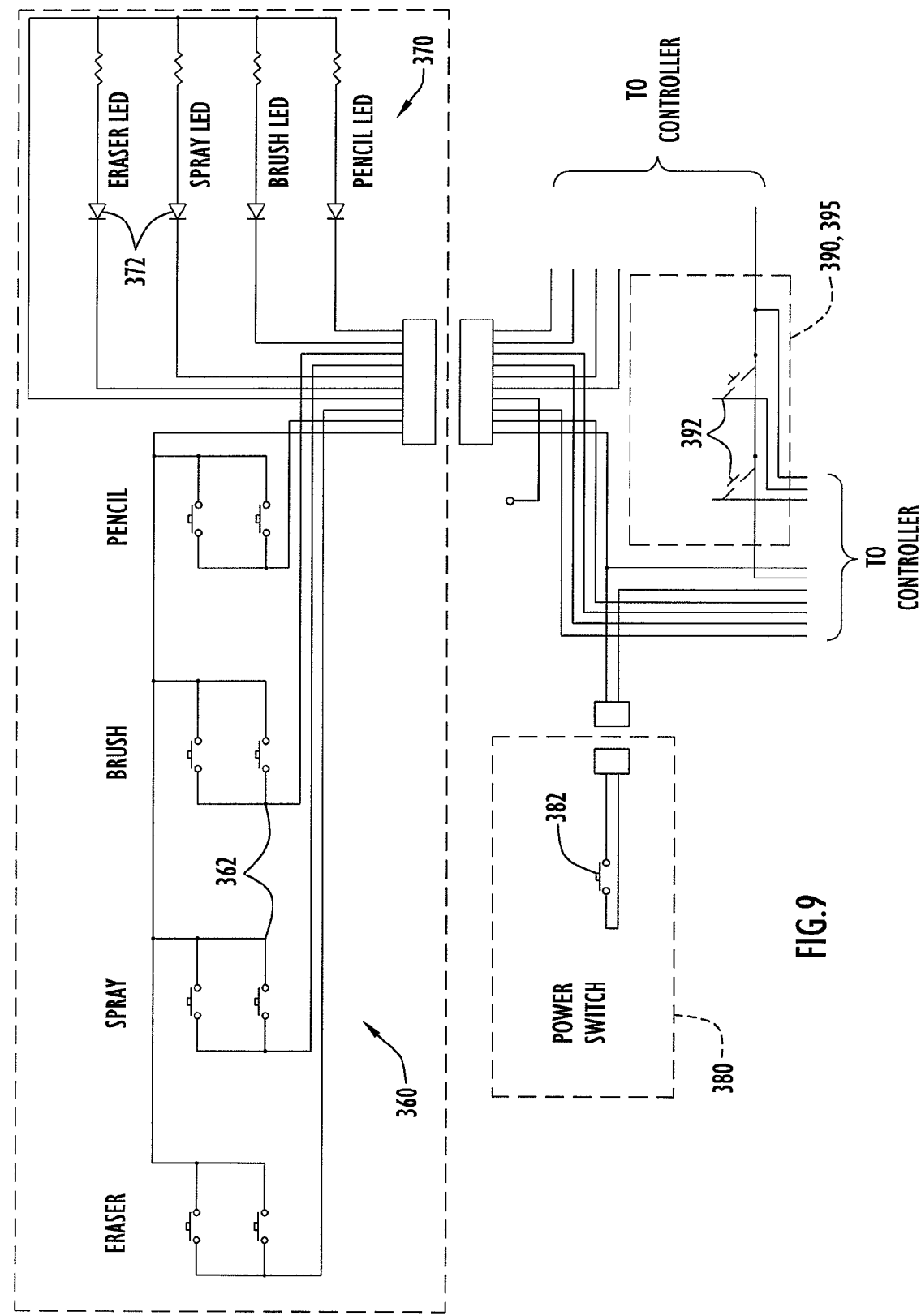

FIG. 9 illustrates the inkwell switches 360 and the inkwell LEDs 370. The inkwell switches 360 comprises a plurality of push switch pairs 362, one pair associated with each of the eraser button 142, spray button 144, brush button 146 and pencil button 148. Each of the switches in the switch pairs 362 are small rubber push switches. There are two switches for each of the inkwell push button in order to ensure that the button does not get stuck when it is depressed and released. The inkwell LEDs 370 comprises a plurality of LEDs 372, one for each of the eraser button 142, spray button 144, brush button 146 and pencil button 148. The inkwell switches 360 and inkwell LEDs 370 may be mounted on the same printed circuit board beneath the inkwell buttons 140 and connected to the controller 310.

Still referring to FIG. 9, the power switch 380 comprises a push switch 382 that connects to the controller 310. Similarly, the utilities switch 390 and the project studio switch 395 each comprise push switches 392 that may be mounted on the same printed circuit board.

FIG. 10 illustrates the toolbox switch 355. The toolbox switch 355 comprises a slider switch 357 that is movable between first and second contacts at first and second positions, respectively.

Figure 11A:
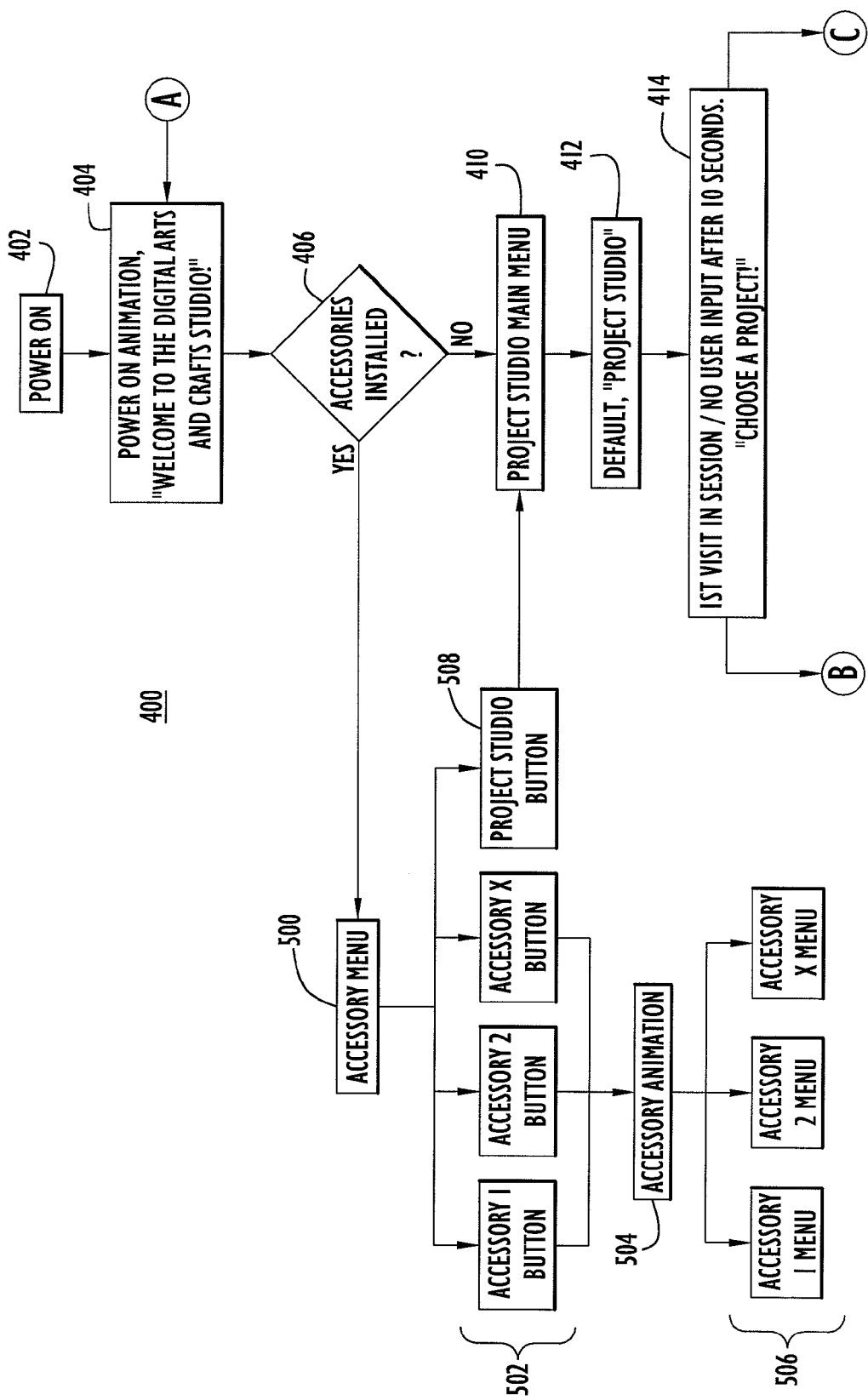
FIGS. 11A, 11B and 11C illustrate a flow chart that depicts operation of the computer peripheral toy device according to an embodiment of the present invention.
Figure 11B:
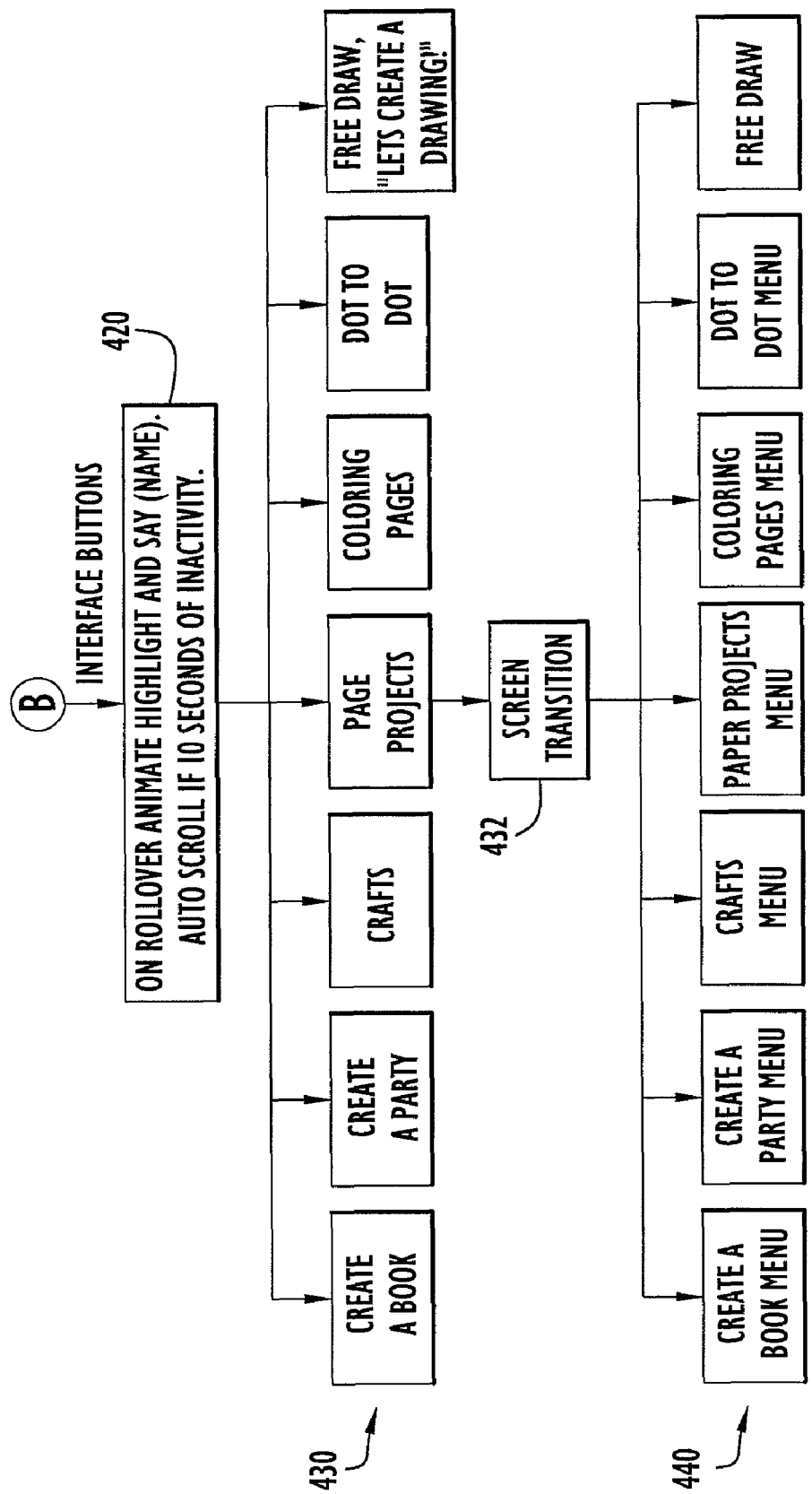
Figure 11C:
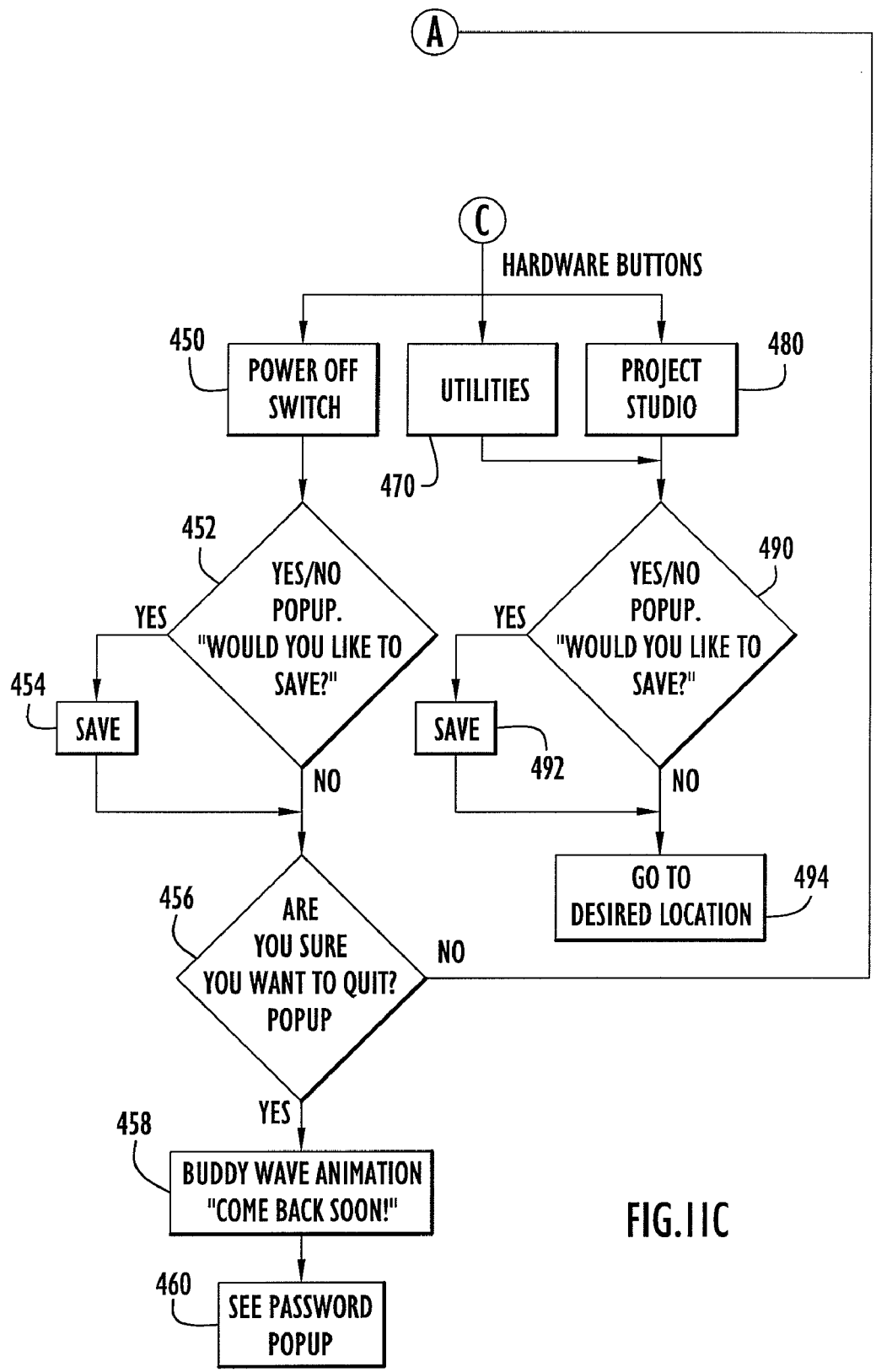

Turning now to FIGS. 11A, 11B and 11C, a flow chart illustrating at a high level operational flow 400 of the device 10 is described. Reference is also made to FIG. 1 for the following description. The device 10 is connected to a PC 20 by the connection cable 12. For example, the connection cable 12 is a USB cable that plugs into a USB port on the PC 20. The operating system on the PC 20 recognizes the newly connected hardware and displays user prompts to guide a user in the installation of the driver software for the device 10 that is stored on the CD 40 for example, or downloaded from a web site.

After the driver software is installed, the process 400 begins at 402 when the driver software application on the PC is activated (opened) by pressing the power on/off button 182. At 404, the driver software generates an animated welcome screen that displays a welcome message "Welcome to the Digital Arts and Crafts Studio," for example, and may also produce voice audio and music that announces the welcome message.

Next at 406, the driver software determines whether any accessory software features are installed. The accessory software features are functions that may not be included in the driver software with the initial purchase of the device 10, but are purchased separately.

When the driver software determines that there are no accessories installed, then at 410, the driver software generates a main menu for display on the display 22 connected to the PC 20. At 412, a voice audio announcement is generated and played, such as "Project Studio," to the user through the speakers connected to the PC 20 or through the speakers on the PC 20 itself.

At 414, the driver software determines whether it is the first time that the device 10 has been turned on during a session, or whether a period of time has elapsed since the voice audio announcement at 412. If either case is true, then a voice audio announcement "Choose a Project" is activated, and the driver software displays on the display 22 an array of icons representing each of the different activities that a user may play on the device 10. At this time, the user may place the tip of the stylus 200 on the surface of the drawing tablet 110 and the driver software will track and display on the display 22 the position of the stylus by a small arrow or other similar icon. Selection of an icon function from the displayed user interface menu is made when the user places stylus 200 on the tablet 110 at a location that positions the stylus arrow over the icon and the user pressed down on the push button 204 to actuate the push switch mounted inside the stylus 200.

As shown in FIG. 11A, if at 406, the driver software on the PC 20 determines that accessory software functions have been installed on the PC 20 for use with the device 10, then the process proceeds to 500 where an accessory menu screen is displayed. At 502, depending on which button for any accessory function button is depressed, an accessory animation is displayed at 504 and the menu screen for the selected accessory function is displayed at 506. If the project studio button is depressed while in the accessory menu at 508, then the process continues at 410.

Turning to FIG. 11B, next, at 420, the driver software will animate an icon when the tip of the stylus 200 is moved across the drawing tablet 110. When the arrow icon displayed on the display 22 passes over the icon, the driver software will also announce a voice audio message that states the name of the corresponding activity. For example, when the user moves the stylus 200 across the tablet 110, the arrow icon for the stylus will eventually pass over one of the icons, such as the "Create a Book" icon, and the driver software will animate or move that icon forward or upward and also announce the voice audio message "Create a Book." If the user makes no selection for a predetermined period of time, the driver software may automatically scroll through the icons, animating the icon and generating the voice audio message for each activity as shown at 430. When the user selects an activity icon at 432, the driver software transitions to display the menu screen for the corresponding selected activity as depicted at 440.

Referring to FIG. 11C, when the on/off switch 182 is pressed again at 450, the driver software at 452 generates a save prompt screen that prompts a user to save his/her work. The user can opt to save his/her work at 454, and then at 456 the driver software generates a quit prompt screen to allow the user to confirm that he/she wants to quit operation of the device 10. If the user confirms he/she wants to quit, then at 458 an animated character may be displayed on the display 22 and a voice message may be announced to the user. Finally, at 460, a password screen is displayed that requires entry of a password in order to disable the driver software application on the PC 20.

If either the utilities button 162 or the project studio button 164 is depressed, then the corresponding function is invoked at 470 or 480 at 494, only after a user is given the option to save any currently active activity or work project at 490 and 492.

Operations of the various buttons on the device 10 shown in FIGS. 1 and 2 are now described. A user "dips" the tethered stylus 200 into one of the inkwell buttons 140 to give the stylus a desired drawing function, e.g., an eraser, a spray can, a paint brush, or a pencil. Various ones of the design tool buttons 120 may be used for additional drawing effects. For example, the paint bucket button 128 may be used to fill open areas, shapes, and backgrounds with a color selected using one of the color palette buttons 170.

As indicated above, a user may open the expanded "toolbox" feature by moving the toolbox switch 130 upward to the open position. This displays a pop-up window that contains a variety of expanded options for the active stylus/drawing tool. For example, the expanded choices for the paint brush drawing tool may include different brush types (oil, tempera, watercolor, and fan), line thickness variations, and fun line styles (e.g., bubbles, stars, bricks, hearts, and flowers). In addition, the toolbox switch 130 alters the output of the function buttons, providing choices beyond the default setting. For example, there are expanded options for the color palette buttons 172 (additional color choices), the stamper button 127 (additional images to be used as stamps), the special effects button 125 (providing additional animation features such as flip, insert text, and blur), the paint bucket button 128 (paint gradients/patterns, stripes, polka dots, etc.), the background button 126 (additional backgrounds images), and the screen erase button 123 (different effects when the screen is erased such as explosion, break apart, sparkles, etc.).

The driver software generates instructional voice audio announcements that guide and teach a child user how to create different items such as greeting cards, drawings, etc. For example, when a child engages the greeting card button, the device states: "This is the greeting card! This project has six steps. Press the green arrow to begin." After pressing the green arrow, the device then instructs the child as follows: "Let's decorate the greeting card! First, decorate the front of the card." The process continues, providing audio content that guides the child to use various tools (pencils, markers, etc.), as well through steps of the process (to decorate the inside of the card, the back of the card, etc.).

Activities

The following are brief descriptions of examples of activities that may be performed by a user with the device 10.

"Free Draw"

The "Free Draw" activity is first described. The "Free Draw" activity allows a user to draw or write on the tablet 110 with the stylus 200 in any freestyle manner the user wishes, and the resulting image is displayed on the display 22 connected to the PC. The user may change the stylus effect by inserting the tip of the stylus 200 into and depressing one of the inkwell buttons 140. In addition, the user may select any of the design tool buttons 120 as desired. During this activity, a user may slide the toolbox switch 130 open in response to which the driver software will display a small window containing additional parameters that may be selected for a particular design tool that is currently being used. For example, the size (thickness) or style of a line drawn with the pencil inkwell button function may be adjusted. Similarly, if the stamper button function is used, then the toolbox switch may invoke display of options for different types of stampers that are grouped by categories (each category comprising several different styles), as well as by size of the image. Likewise, if the background button function is being used, and the toolbox switch moved to the open position, a window is displayed in which a user may select from a variety of different images for a background. A user may save a drawing created with the "Free Drawing" activity for later retrieval or editing.

"Coloring Pages"

The "Coloring Pages" activity provides several different coloring pages that a user may color using the stylus 200 and the color palette buttons 170. In addition, the design tool buttons 120 may be used to further decorate the colored page. Furthermore, the toolbox switch 130 may be opened to adjust parameters of the design tools and drawing tools used in a coloring page project.

"Create a Book"

The "Create a Book" activity displays several types of pages for a book. Then, on a selected page type, a user may decorate the book using any of the design and drawing tool functions of the device 10. For example, there is a "title" page, page types with areas for images and text, etc. After a user completes a page, he/she may return to the page type menu page and select another page type to follow the previously created page. Directional arrows are displayed to allow a user to move forward and backward through pages in the book. The book may be printed out on a printer attached to the PC together with printed instructions to guide the user in created a simulated "bound" book.

"Dot-to-Dot"

The "Dot-to-Dot" activity displays several types of dot-to-dot drawings from which a user may select. The user connects the dots in the proper number or letter sequence using the stylus 200. The user may also further decorate any of the dot-to-dot drawings using the design tool and drawing functions of the device 10. The toolbox switch 130 may be used to augment the design tool features as described above.

"Paper Projects"

The "Paper Projects" activity allows a user to create a variety of paper items, such as a greeting card, customized notepaper, envelope, certificate and calendar. In creating these items, the user may use any of the design tool, drawing and coloring functions of the device 10. The driver software guides the user in decorating each portion of the paper item, such as the front of an envelope and the back of the envelope, the inside of the card and the outside of the card, etc. When the item is complete, the user is prompted to print the item on an attached printer and also to save the item for later retrieval and editing.

"Crafts"

The "Crafts" activity guides the user in creating a variety of crafts items such as a picture frame, paper people/characters, paper airplanes, a pencil holder, a paper flow, a jumping paper frog figure, a paper mobile, etc. Like the "Paper Projects" activity, the user may use any of the design tools, drawing and coloring functions of the device 10. The driver software guides the user in decorating each portion of the item. When the user has completed all of the steps in creating the item, the driver software prompts the user to print the item on an attached printer, and to save the item for later retrieval. In addition, for certain items that require folding or other additional assembly steps, the driver software will also print out instructions for the user to follow in completing final assembly of the item.

"Create a Party"

The "Create a Party" activity guides the user in creating a variety of paper items that are associated with a party, such as a birthday party. The paper items created in this activity may include a party invitation, a paper crown, a paper party hat, a party sign, gift tags, place cards, placemats, party menu planner, etc. This activity operates in a similar manner to the "Crafts" activity.

Parent Utilities

The driver software has a parent utilities function that can be activated through the utilities button 162. When the parent utilities function is opened, it will first prompt a parent to enter a password and a password question and answer, in order to provide password protection access to the parent utilities screen. Once the password is set, the driver software will display the parent utilities screen. On the parent utilities screen, a parent may limit the amount (zero or more) of printing of projects permitted during a user's session.

Password Controlled Deactivation

The driver software application further comprises a password feature a screen or window is displayed with a dialog that requires entry of a predetermined user-defined password before allowing access to other software applications on the PC 20 after the device 10 is turned off or disconnected from the PC 20. When the driver software application is active, the user may turn off the device 10 by depressing the on/off button 182. A user session is not terminated if the device 10 is disconnected from the PC 20. The driver software will prompt the user to reconnect the device 10 to the PC in order to terminate the user session as follows. The driver software will determine whether a password has been set in the parent utilities function. If a password has been set, then the driver software will display a password entry screen that requires a parent or other individual with knowledge the password to enter the appropriate password in order to close the driver software application on the PC 20. This ensures that a child user cannot gain access to the normal functions of the PC 20 without parental approval or accompaniment. For example, parents may not want a child turning off the device 10 (or disconnecting it from the PC 20) and thereby have access to data on the PC 20 or access to the Internet. Thus, if a password has not been set in the parent utilities function, a child user may turn off the device 10 (or disconnect it from the computer) and use the normal functions of the PC 20 without having a parent or other individual first enter the appropriate password.

Adding and Sharing Pictures

When the driver software is installed on the PC 20, a short-cut icon is installed on the "desktop" of the PC that directs the user to two special folders labeled "Share" and "Add". The "Share" folder is a storage location on the PC where a user may place files for photos, pictures or other images that the user may want to use in the activities, such as a stamper design or a background. In addition, when a user saves a project during use of the device 10, the user may also direct the driver software to store that project such that it can be accessed from the "Share" folder on the PC. The "Share" and "Add" folders may be accessed only when the device 10 is powered off and the driver software is not active. Thus, the user's parent may use the short-cut icon on the PC to access the "Share" and "Add" folders. The parent may access a data file associated with a project created by a child user in the "Share" folder and the parent may email that project to another party, or may post that project to a web page. Similarly, a parent may store photos, pictures or other images into the "Add" folder to enable a child user to use those files for stamper designs or backgrounds.

The systems and methods described herein may be embodied in other specific forms without departing from the spirit or essential characteristics thereof. The foregoing embodiments are therefore to be considered in all respects illustrative and not meant to be limiting.

What is claimed is:

1. A system having a computer and a computer peripheral toy device comprising:
   a. a housing;
   b. a connection cable that connects the housing to a computer including a display;
   c. a drawing tablet on the housing;
   d. a stylus connected to the housing;
   e. a plurality of drawing style buttons on the housing, each drawing style button being shaped to simulate the appearance of an inkwell and comprising a concave portion sized to receive the stylus when depressing the drawing style button;
   f. a plurality of design tool buttons disposed on the housing adjacent to said drawing tablet;
   g. a controller in the housing that is electrically connected to switches associated with each of the drawing style buttons and design tool buttons, and to the stylus, wherein the controller determines a position of the stylus on the drawing tablet and detects when a switch is actuated by depressing a design tool button or a drawing style button and supplies messages to the computer comprising information representing the same; and
   h. computer software for installation on the computer, that when executed, causes the computer to respond to the messages received from the controller to engage in a drawing activity using drawing style parameters based on which of the drawing style buttons and design tool buttons are selected by a user,
      wherein the computer software further comprises instructions, that, when executed by the computer, cause the computer to present a menu of drawing activities to the user on the display.

2. The device of claim 1, and further comprising a slider switch disposed on the housing that is connected to the controller, the slider switch being configured to slide between a first position and a second position, wherein the controller detects when the slider switch is in the second position and generates a control signal that is supplied to the computer to cause the computer to present to the user options for a drawing style associated with one of the drawing style buttons.

3. The device of claim 2, wherein the computer is responsive to the control signal from the controller indicating that the slider switch is in the second position when one of the design tool buttons is depressed, to present to the user options associated with the corresponding design tool button.

4. The device of claim 3, wherein the design tool buttons comprise one or more of: a paint bucket button that causes the computer to fill a user selected space in drawing; a stamper button that causes the computer to place a user selected image in a drawing; a backgrounds button that causes the computer to place a user selected image as a background in a drawing; a keyboard button that causes the computer to display a keyboard from which a user may select a letter; special effects button that causes the computer to apply a user selected special visual effects to a drawing.

5. The device of claim 1, wherein the computer software comprises instructions, that, when executed by the computer, cause the computer to generate voice audio that guides a user through a drawing activity.

6. The device of claim 1, and further comprising a plurality of color palette buttons positioned on the housing adjacent to the drawing tablet to simulate an appearance of a painter's palette, wherein each of the color palette buttons corresponds to a different color, and wherein the controller further responds to selection of one of the color palette buttons to supply a signal to the computer representative thereof.

7. The device of claim 1, wherein the drawing tablet comprises a drawing surface, and further comprising an antenna grid positioned beneath the drawing surface, wherein the controller generates signals that are supplied to the antenna grid for transmission, and wherein the stylus comprises a pen-shaped housing, a receiving antenna being mounted in a tip of said pen-shaped housing and which receives signals transmitted by the antenna grid, and wherein the controller determines a position of a tip of the stylus on the drawing tablet based on signals received by the receiving antenna of the stylus.

8. The device of claim 7, wherein the stylus further comprises a push button mounted on a distal end of the stylus and a push switch in the pen-shaped housing of the stylus that is operatively coupled to the push button such that the push switch is actuated when the push button is depressed, and wherein the controller detects actuation of the push button switch in order to correlate the location of the stylus on the drawing tablet when the push switch is actuated.

9. The device of claim 8, wherein the controller supplies signals to the computer that indicate the location of the stylus on the drawing tablet and whether the push switch in the stylus is actuated.

10. The device of claim 1, and further comprising a cylindrical receptacle on the housing that receives the stylus when not in use, and an elongated hole on a side portion of the housing that is sized to receive substantially an entire length portion of the stylus when not in use.

11. The device of claim 1, and further comprising a graphic member on the housing adjacent each drawing style button, wherein each graphic member comprises an ornamental appearance that represents the function of its corresponding design tool button.

12. The device of claim 1, wherein the computer software causes the computer to generate for display a screen that requires entry of a predetermined user-defined password before allowing access to other software applications on the computer after the device is turned off or disconnected from the computer.

13. A computer peripheral drawing device, comprising:
 a. a housing;
 b. a connection cable that connects the housing unit to a computer including a display;
 c. a drawing tablet on the housing;
 d. a stylus connected to the housing that is used on the drawing tablet;
 e. a plurality of drawing style buttons on the housing, each drawing style button being shaped to simulate the appearance of an inkwell and comprising a concave portion sized to receive the stylus when depressing the drawing style button;
 f. a plurality of design tool buttons disposed on the housing adjacent to said drawing tablet;
 g. a controller in the housing that is electrically connected to switches associated with each of the drawing style buttons and design tool buttons, and to the stylus, wherein the controller determines a position of the stylus on the drawing tablet and detects when a switch is actuated caused by depressing of a design tool button or a drawing style button and supplies messages to the computer comprising information representing the same; and
 h. a slider switch disposed on the housing and connected to the controller, the slider switch being configured to slide between a first position and a second position, wherein the controller detects when the slider switch is in the second position and generates a control signal that is supplied to the computer to cause the computer to present to the user additional options for a drawing style associated with one of the drawing style buttons, wherein the additional options are presented on the display.

14. The device of claim 13, and further comprising a graphic member on the housing adjacent each drawing style button, wherein each graphic member comprises an ornamental appearance that represents the function of its corresponding design tool button.

15. The device of claim 14, and further comprising a first graphic member that has the appearance of a pencil eraser that is adjacent a first drawing style button, a second graphic member that has the appearance of a spray paint can that is adjacent a second drawing style button, a third graphic member that has the appearance of a paint brush that is adjacent a third drawing style button and a fourth graphic member that has the appearance of a pencil that is adjacent a fourth drawing style button.

16. The computer peripheral device of claim 13, and further comprising computer software for installation on the computer, that when executed, causes the computer to respond to the messages received from the controller to engage in a drawing activity using drawing style parameters based on which of the drawing style buttons and design tool buttons are selected by a user.

17. The computer peripheral device of claim 13, and further comprising a plurality of color palette buttons positioned on the housing adjacent to the drawing tablet to simulate an appearance of a painter's palette, wherein each of the color palette buttons corresponds to a different color, and wherein the controller further responds to selection of one of the color palette buttons to supply a signal to the computer representative thereof.

18. The computer peripheral device of claim 17, wherein the drawing tablet is positioned on a surface of the housing between the plurality of design tool buttons and the plurality of color palette buttons, and wherein the plurality of design tool buttons are positioned in a circular arrangement on the housing and partitioned into sectors separated by a raised divider members to simulate an appearance of a dial mechanism.

19. A system having a computer and a computer peripheral toy device comprising:
 a. a housing;
 b. a connection cable that connects the housing unit to a computer including a display;
 c. a drawing tablet on the housing;
 d. a stylus connected to the housing that is used on the drawing tablet;
 e. a plurality of drawing style buttons on the housing, each drawing style button being shaped to simulate an appearance of an inkwell and comprising a concave portion sized to receive the stylus when depressing the drawing style button;
 f. a plurality of design tool buttons disposed on the housing adjacent to said drawing tablet;
 g. a plurality of color palette buttons positioned on the housing adjacent to the drawing tablet to simulate an appearance of a painter's palette, wherein each of the color palette buttons corresponds to a different color;
 h. a controller in the housing that is electrically connected to switches associated with each of the drawing style buttons, design tool buttons, and color palette buttons, and to the stylus, wherein the controller determines a position of the stylus on the drawing tablet and detects when a switch is actuated caused by a depressing of a design tool button, a drawing style button and a color palette button and supplies messages to the computer comprising information representing the same; and i. computer software for installation on the computer, that when executed, causes the computer to respond to the messages received from the controller and to display a menu on the display in response to depression of at least one of the design tool buttons, the drawing style buttons, and a color palette buttons, wherein the drawing tablet is positioned on a surface of the housing between the plurality of design tool buttons and the plurality of color palette buttons, and wherein the plurality of design tool buttons are positioned in a circular arrangement on the housing and partitioned into sectors separated by a raised divider members to simulate an appearance of a dial mechanism.

20. The computer peripheral device of claim 19, and further comprising computer software for installation on the computer, that when executed, causes the computer to respond to the messages received from the controller to engage in a drawing activity using drawing style parameters based on which of the drawing style buttons, color palette buttons and design tool buttons are depressed by a user.

21. The computer peripheral device of claim 20, wherein the computing software causes the computer to generate for display a screen that requires entry of a predetermined user-defined password before allowing access to other software applications on the computer after the device is turned off or disconnected from the computer.

* * * * *